Nov. 8, 1955    R. A. YUZA    2,723,052
DRINK DISPENSING DEVICE
Filed Nov. 15, 1950    6 Sheets-Sheet 1

INVENTOR.
Rudolph A. Yuza
BY
Attorney

Nov. 8, 1955    R. A. YUZA    2,723,052
DRINK DISPENSING DEVICE
Filed Nov. 15, 1950    6 Sheets-Sheet 2
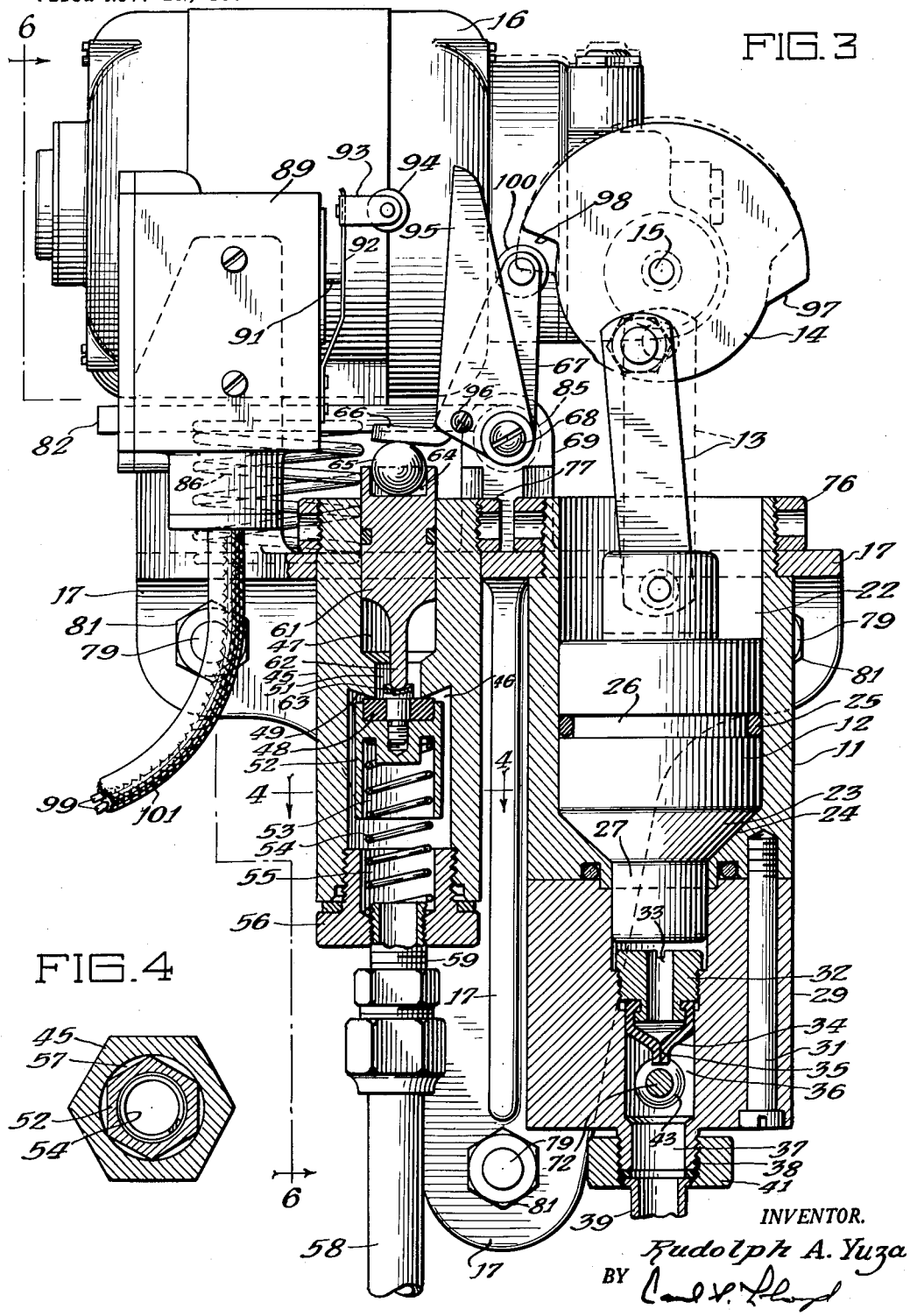

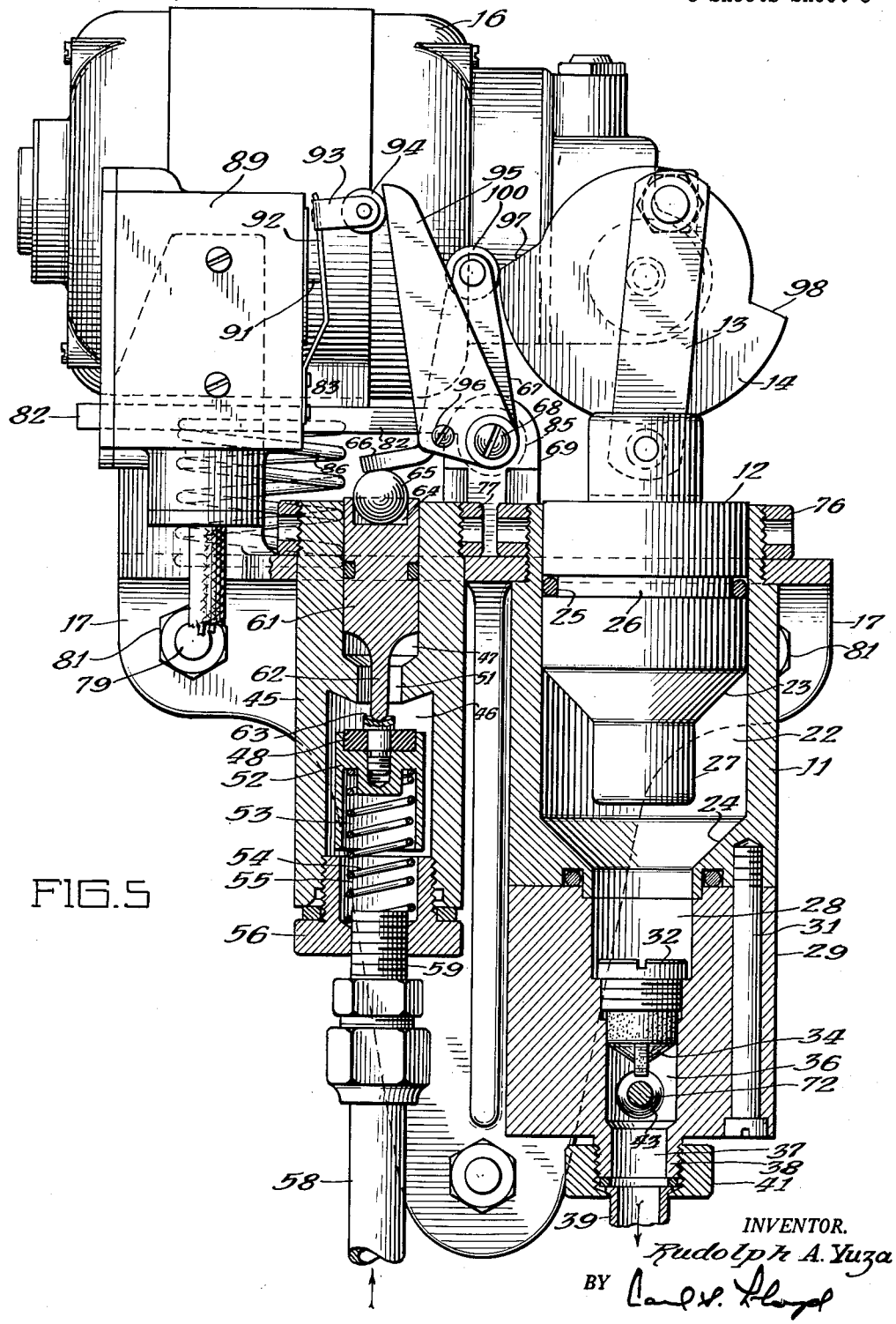

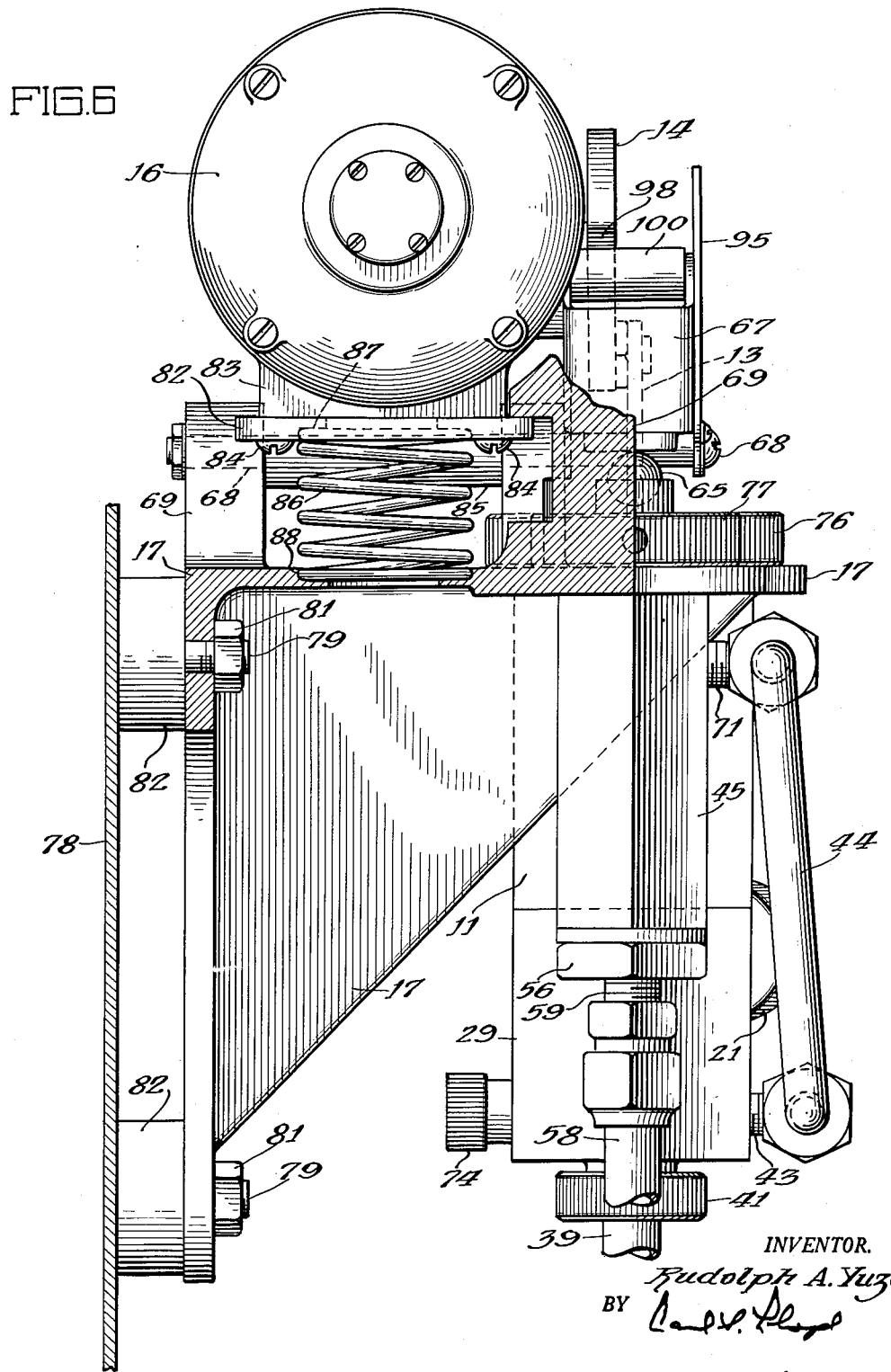

Nov. 8, 1955 R. A. YUZA 2,723,052
DRINK DISPENSING DEVICE
Filed Nov. 15, 1950 6 Sheets-Sheet 5
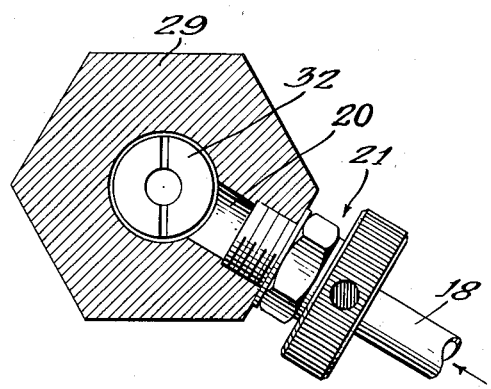
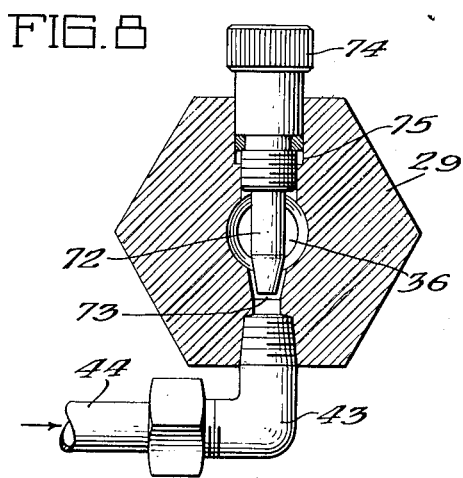
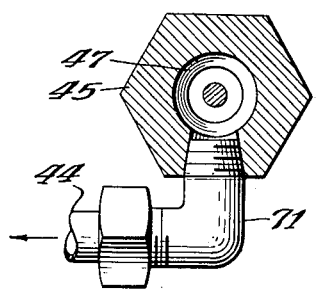
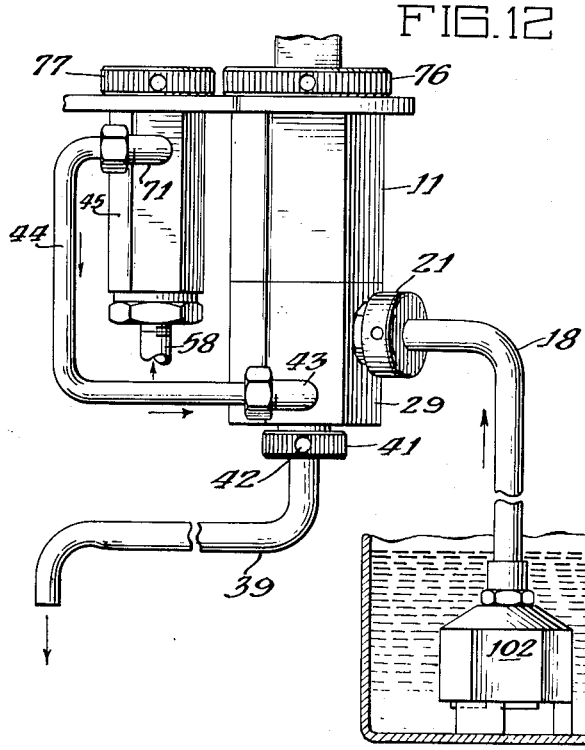
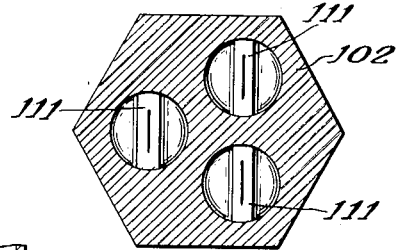
INVENTOR.
Rudolph A. Yuza
BY
Attorney Nov. 8, 1955

R. A. YUZA 2,723,052

DRINK DISPENSING DEVICE

Filed Nov. 15, 1950

INVENTOR.
Rudolph A. Yuza
BY
Attorney

United States Patent Office 2,723,052
Patented Nov. 8, 1955

2,723,052

DRINK DISPENSING DEVICE

Rudolph A. Yuza, Chicago, Ill., assignor to Mills Industries, Incorporated, Chicago, Ill., a corporation of Illinois Application November 15, 1950, Serial No. 195,810

4 Claims. (Cl. 222—133)

This invention relates to mechanism for dispensing mixed drinks such, for example, as orange juice or concentrate and plain or carbonated water, and has for its general object the provision of an apparatus for this purpose which possesses desirable characteristics of such devices to a greater extent than prior constructions.

More specifically, one of the principal objects of the invention is to provide a device of this character in which "air bind," a commonly experienced fault, is effectively prevented. To this end provision is made for exhausting all of the air from the syrup or juice chamber and for thereafter preventing the retention therein of air pockets which would interfere with complete emptying of the chamber on each dispensing operation.

A further object is the provision in such a device of means for maintaining completely sanitary conditions at all times, thus meeting all health requirements and insuring that a palatable drink will be dispensed on each operation.

A further object is to provide a dispensing apparatus which is particularly well adapted to handle a pulpy beverage base, such as orange juice or concentrate, or other material having a high viscosity. My device is adapted to accurately measure the amount of such material entering into each drink without the use of metering orifices, which have a tendency to become clogged or jammed by the pulp or other solid or heavy matter in beverage material of this character.

Another object of the invention is to provide in a dispenser for such a beverage means for ejecting the beverage into a cup or like receptacle with such force as to cause a head of foam to be formed on the drink, thus giving it a pleasing and appetizing appearance.

A still further object is to provide an apparatus for this purpose which is simple and inexpensive in construction and in which the syrup or juice handling part of the structure may be quickly and easily removed and replaced to facilitate cleaning, adjustment or repair.

Other objects and advantages of the invention will appear from the following description, taken in connection with the accompanying drawings, in which:

Fig. 3 is a vertical sectional and elevational view, taken substantially on the line 3—3 of Fig. 1;

Fig. 4 is a cross-sectional view of the inlet chamber of the water valve, taken substantially on the section line 4—4 in Fig. 3;

Fig. 5 is a view similar to Fig. 3 showing the parts in a different position;

Fig. 6 is an end elevational view of the device, taken substantially on the line 6—6 in Fig. 3;

Fig. 7 is a cross-sectional view of the inlet to the syrup valve, taken substantially on the section line 7—7 of Fig. 2;

Fig. 8 is a cross-sectional view of the water inlet to the mixing chamber in the lower part of the syrup valve, taken substantially on the section line 8—8 of Fig. 2;

Fig. 9 is a cross-sectional view of the outlet from the water valve, taken substantially on the section line 9—9 of Fig. 2;

Fig. 10 is a vertical sectional view of the syrup intake head;

Fig. 11 is a cross-sectional view thereof, taken substantially on the section line 11—11 of Fig. 10;

Fig. 12 is an elevational view of the valves showing the syrup intake head in the syrup reservoir and also the discharge spout for the mixed drink;

Figure 1:
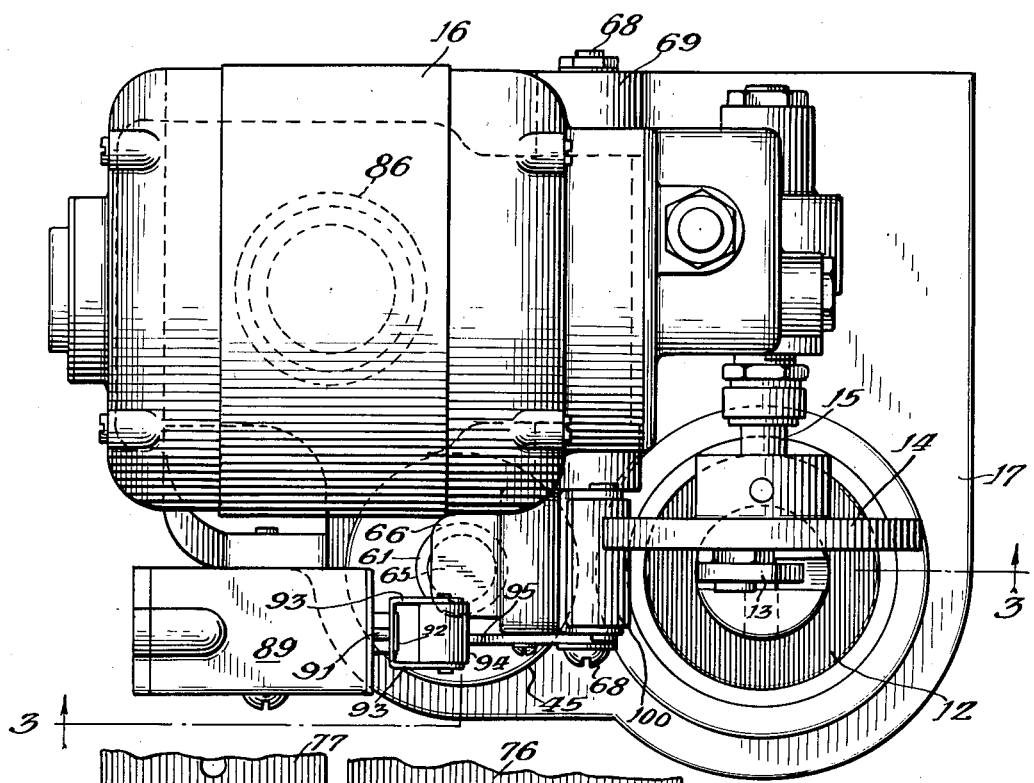
Fig. 1 is a top plan view of a dispensing device in which my invention is embodied.

Referring first to Fig. 3, which shows the device in its starting position, the reference numeral 11 indicates the syrup valve in which a piston 12 is mounted for vertical reciprocation. Said piston is connected by a link 13 with a cam 14, mounted on a motor shaft 15, driven by a motor 16 which is mounted on a frame 17 in manner which will be hereinafter explained.

Figure 2:
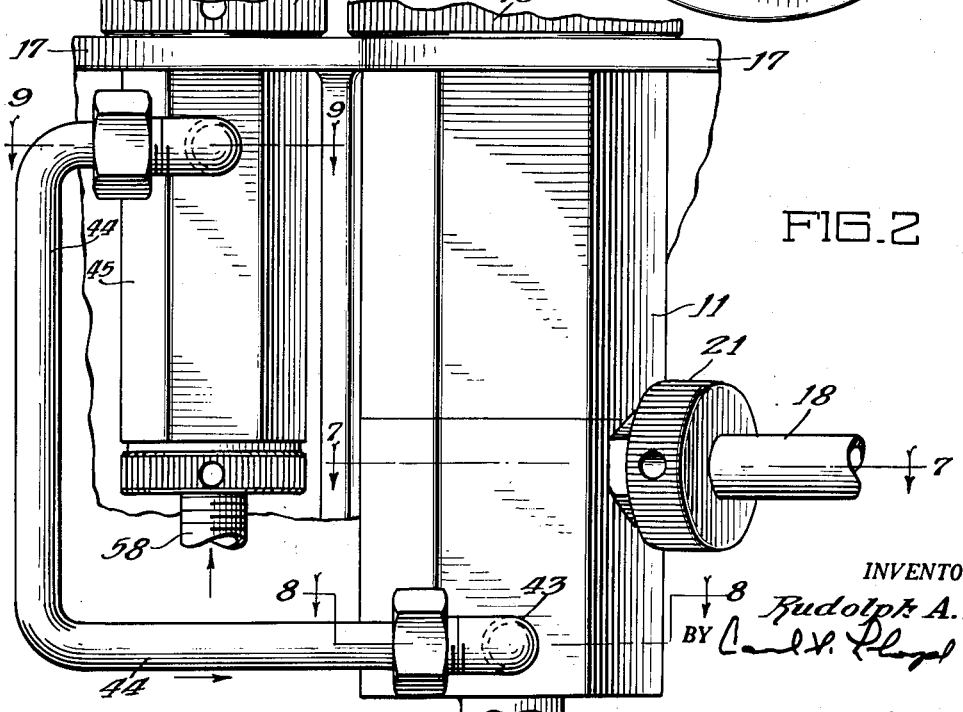
Fig. 2 is an elevational view of the syrup and water valves employed in the device and certain of the piping associated therewith.

An inlet pipe 18 (see Fig. 2) leads from a syrup reservoir 19 (see Fig. 12) to an inlet opening 20 (see Fig. 7) in the lower part of the syrup valve chamber, being fitted thereto by means of a lock nut construction generally indicated at 21.

The piston 12 is closely fitted within a cylinder 22 in the valve 11 and is tapered at its lower end, as indicated at 23, to conform to a tapered seat 24 at the bottom of the cylinder. The piston has a liquid-tight seal with the wall of the piston by means of an O ring 25 in a groove 26 in said piston and at the lower end of the piston there is a projection 27 which extends into a recess 28 formed in the lower end of the cylinder and in a block 29 attached thereto by means of screws 31. An apertured nut 32 is screwed into the bottom of the recess 28 and has a central aperture or passage therein indicated by the reference numeral 33. A check valve 34 made of neoprene, or like flexible material, is secured to the bottom of the nut 32 and has a normally closed outlet opening 35 which permits outflow of the syrup when ejected by the piston but prevents any return flow in manner which will readily be understood. Said check valve opens into a mixing chamber 36 in the bottom part of the block 29 and said chamber communicates through a passage 37 in an extension 38 on the bottom of said block 29 with an outlet pipe or spout 39 by which the mixed drink is directed into a cup or other receptacle. The pipe 39 is secured to the extension 38 by means of a thumb nut 41 adapted to be held in place by means of a set screw 42.

The water is admitted to said mixing chamber 36 through an elbow 43 connecting with a pipe 44 leading from the top of a water valve 45, which may be mounted adjacent the syrup valve 11 (see Figs. 8 and 12).

Said water valve has a lower chamber 46 and an upper chamber 47 therein, and a valve 48, cooperating with a valve seat 49, serves to normally close a passage 51 between said chambers. Said valve 48 is carried by a head 52 which has a recess 53 in the lower part thereof adapted to receive a spring 54, the lower end of which extends into a recess 55 in a nut 56 connected to the lower end of said water valve, such spring serving to normally hold said valve 48 in its seated position. Said head 52 is preferably of hexagonal form, as shown in Fig. 4 of the drawings, so that the points thereof engage the wall of the chamber 46 to keep said valve centered while permitting passage of water through passageways 57 between said head and the wall of the chamber resulting from the hexagonal form of the head.

The recess 55 in the nut 56 is communicably connected with a water inlet pipe 58 by means of a nipple 59 whereby water under normal city pressure may be admitted to the chamber 46 and may be allowed to flow into the chamber 47 when the valve 48 is unseated in the operation of the device.

The unseating of said valve 48 is accomplished by a plunger 61 mounted in the chamber 47 and having an extension 62 thereon, the end of which engages a recessed upper projection 63 on the valve 48. In the upper end of said plunger 61 there is a recess 64 in which a ball 65 is positioned, the latter being engaged by a foot 66 on a cam-actuated lever 67 mounted on a pivot pin 68 extending between brackets 69 on the frame 17.

The water outlet pipe 44 is connected with the chamber 47 in the valve casing 45 by means of an elbow 71 and opposite the inlet end of the elbow 43 at the other end of said pipe there is a needle valve 72 extending through the chamber 36 and into a water inlet opening 73 in the block 29 at the lower end of the valve casing 11 (see Fig. 8). Said valve member 72 is adjustable by means of a thumb nut 74 threaded into an opening 75 in the opposite side of the block 29 from the water inlet passage 73, whereby the size of the latter passage may be restricted to the extent desired.

The top portions of the valve casings 11 and 45 extend through a horizontal portion of the frame 17 and are threaded to receive lock nuts 76 and 77, respectively, by which they are held in place.

The frame 17 is secured to a wall or mounting board 78 by means of bolts 79 and nuts 81, being spaced from said wall, if desired, by spacing rings 82.

The motor 16 is supported from a plate 82 to which it is secured by webs or flanges 83 and screws 84. One end of said plate 82 is pivotally supported from the pivot pin or shaft 68 by means of a collar or collars 85 formed on such end of the plate and the remainder of the plate is yieldably supported by means of a coil spring 86, one end of which is received in a recess 87 on the under side of the plate and the other end in a recess 88 on the top side of the horizontal portion of the frame 17 (see Fig. 6).

Mounted to one side of the motor 16 is a switch housing 89 containing a normally open switch having an actuating pin 91 protruding from the housing and engaging a leaf spring 92 having ears 93 at the upper end thereof in which a roller 94 is carried. Said roller is adapted to be engaged by a switch actuator 95 which is pivotally mounted on the pivot pin or shaft 68 and attached to the arm 67 on said shaft by means of a screw 96. Said arm 67 carries a roller 100 at its upper end adapted to be engaged by the high or actuating portion of the cam 14 which has a riser 97, a drop-off shoulder 98 between said portion and the low or idle portion thereof.

The switch contained in the housing 89 is connected to a source of electric current by wiring 99 contained in a cable 101 and said switch is connected in parallel with another switch (not shown but which will be referred to in the statement of operation hereinafter contained) to the motor 16 to control the operation thereof.

Referring now to Figs. 10 to 12, inclusive, it will be noted that the pipe 18 leads to the syrup valve from a syrup intake head 102 positioned in the syrup tank 19 and supported from the floor thereof by feet 103 and 104 which serve to space intake openings in the bottom of said head from the floor. Said openings, one of which is shown at 105 in Fig. 10, are provided in nuts 106 threaded into passages 107 in said head communicating with an outlet chamber 108 from which the syrup passes to the pipe 18 through a nipple 109. Check valves 111, similar to the check valve 34 previously mentioned are provided above the passages 105 to prevent any back flow of the syrup into the reservoir.

Figure 13:
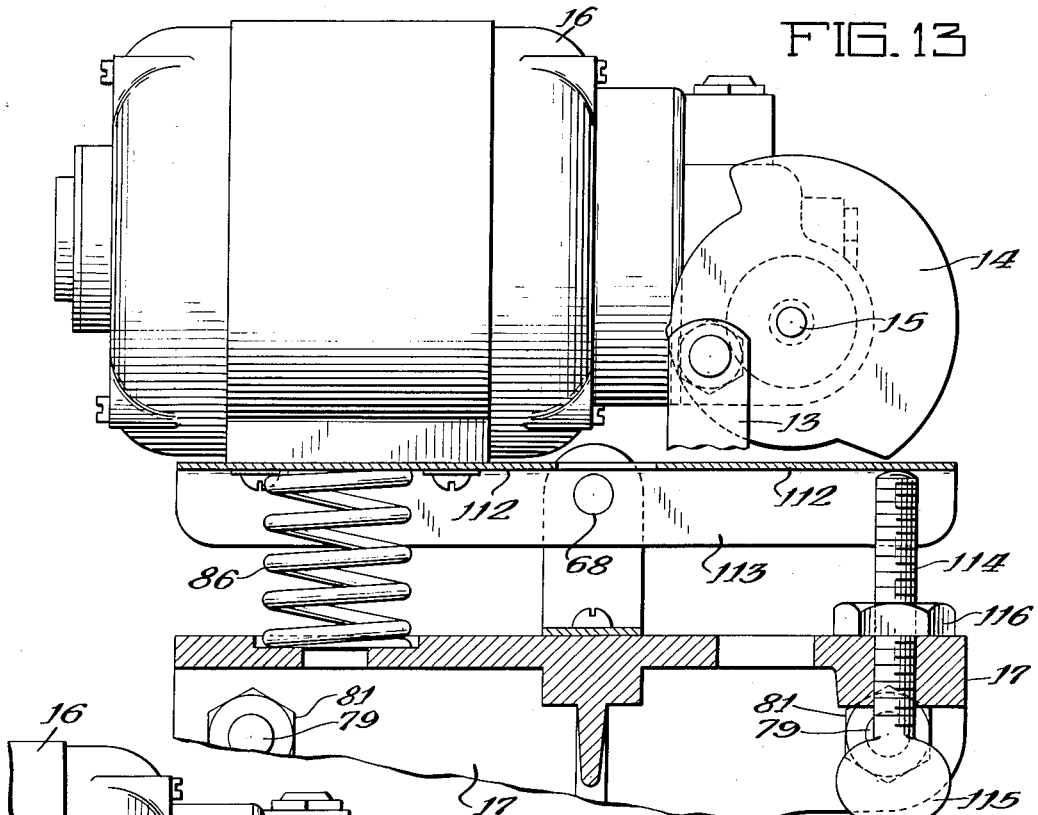
Fig. 13 is an elevational view of a modified form of mounting structure for the motor by which the device is operated.
Figure 14:
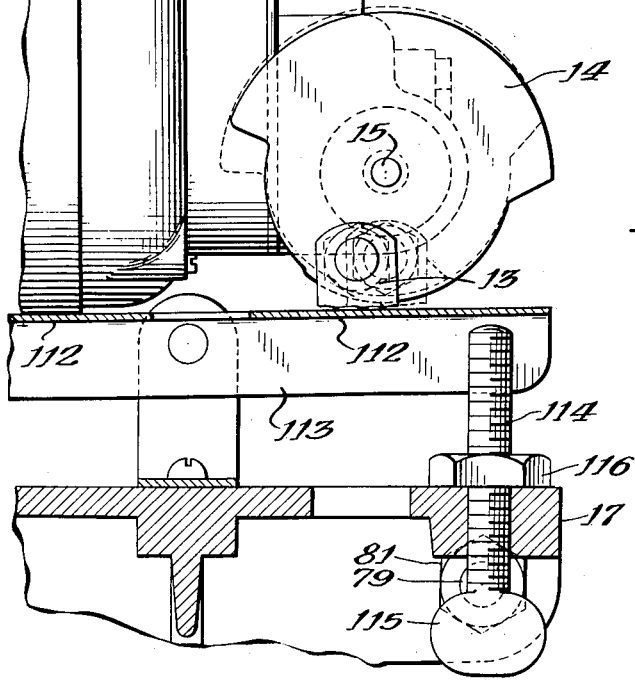
Fig. 14 is a fragmentary view similar to Fig. 13 showing certain parts in another position.

Referring finally to the modification of the motor mounting structure shown in Figs. 13 and 14, a support plate 112 for the motor is substituted for the plate 82 shown in the other figures and extends forwardly beyond the hinge point, said plate having downwardly extending flanges 113 through which the hinge pin 68 extends. A thumb screw 114 extends upwardly through an outer edge of the frame plate 17 and provides a support for the forward end of said motor-supporting plate 112.

Said screw has a thumb piece 115 formed in the lower end thereof and a nut 116 is carried by said screw above the frame plate 17 to hold the screw in desired position. It will be evident that by adjusting the screw the point of support of the outer end of the plate 112 may be varied. Upon rocking motion of the motor structure on the pivot pin 68 the lowermost limit of the return movement of said motor structure is determined by the position of said screw. By thus varying the lowermost position of the end of the motor which carries the cam 14, by which the piston 12 is actuated, the stroke of said piston may be varied, within limits, to determine the exact volume of the beverage juice to be expelled from the syrup valve 11 upon each operation of the device.

The operation of the device is as follows:

Assuming the parts to be in the position shown in Fig. 3 and the motor 16 to have been started by the closing of a switch (not shown) for operating some other mechanism, such as a cup dispensing mechanism with which the device of the invention is normally used, the cam 14 will be set in motion and, through the medium of the link 13, will raise the piston 12 from the position shown in Fig. 3 to that shown in Fig. 5. As the cam approaches the position shown in the latter figure the riser 97 thereon will engage the roller 100 on the arm 67 and will also move said arm from the position shown in Fig. 3 to that shown in Fig. 5. This will result in opening the water valve and will also result in closing the switch contained in the housing 89. The closing of said switch will result in maintaining the motor circuit until the roller 100 rides off the high part of the cam 14 even though the parallel switch above mentioned may be allowed to open in the meantime, as is normally the case.

The opening of the water valve 48 will start the water flowing through the pipe 44 to the mixing chamber 36 and rotation of the cam 14 from the position shown in Fig. 5 toward the position shown in Fig. 3 will force the piston 12 downwardly, causing it to expel from the cylinder 22 the syrup which was drawn in by suction on the upstroke of the piston. This syrup will mix with the water in the chamber 36 and the mixed drink will flow out through the faucet 39.

The arrangement is such that the piston will be fully seated against the seat 24 at the bottom of the cylinder 22 and will be urged beyond dead or bottoming center therein. This will cause slight rocking of the motor 16 when the cam 14 and link 13 are in the dotted line position shown in Fig. 3, the yielding or resilient support of the motor on the spring 86 permitting this action. The air will have been completely exhausted from the lower part of the cylinder 22 on the first few priming strokes and thereafter the complete seating of the piston on each stroke will overcome the problem of "air bind" which has existed with prior devices for this purpose and will make for a uniform discharge in each operation of the device, thus insuring uniform volume and consistency in all drinks dispensed by the device.

In the modification of the structure shown in Figs. 13 and 14 the rocking motion of the motor structure in counterclockwise direction when the piston reaches dead or bottoming center will lift the outer end of the plate 112 slightly away from the end of the screw 114, as shown in Fig. 14, and said plate will be returned by the spring 86 into engagement with the end of said screw immediately after the bottoming position of the cam 14 has been passed. As previously indicated, adjustment of the screw 114 serves to vary the vertical position of the cam 114 in relation to the valve 11, thus varying the stroke of the piston 12 of said valve and consequently the measure of the juice to be discharged upon each actuation of the piston.

After the piston 12 has been brought fully to the bottom of the cylinder 22, there is a short interval of time before the roller 100 rides off the high part of the cam 14 at the shoulder 98 and this causes the water to continue to flow for an instant after the flow of syrup is terminated. This flushes out the chamber 36 and faucet 39, thus insuring sanitary conditions at all times.

The water inlet valve 72 may be set so as to provide quite a restricted passage thus increasing the velocity of the incoming water and causing foam or a "head" on the drink in the cup, giving it a palatable appearance which is desirable from the standpoint of commercial acceptability of vending machines in which the device is employed.

Various changes may be made in the structure above described without departing from the principles of the invention as herein disclosed.

I claim:

1. A drink dispensing device comprising a valve communicably connected with a source of orange juice or like ingredient, a valve communicably connected with a source of water under pressure, said juice valve comprising a suction chamber and a reciprocable piston therein, operating mechanism for reciprocating said piston and operating said water valve in timed relation, said operating mechanism including a motor and driving connections between the same and said piston arranged to move the latter to a fully seated position in said chamber and to urge the same beyond dead or bottoming center therein on each discharge stroke of the piston, and a yieldable support for said motor whereby slight bodily movement of the latter may take place after seating of said piston in said chamber at the end of each such stroke.

2. A drink dispensing device comprising a valve communicably connected with a source of orange juice or like ingredient, a valve communicably connected with a source of water under pressure, said juice valve comprising a suction chamber and a reciprocable piston therein, operating mechanism for reciprocating said piston and operating said water valve in timed relation, with the water valve held open for a time after the piston has been seated, said operating mechanism including a motor and driving connections between the same and said piston arranged to move the latter to a fully seated position in said chamber and to urge the same beyond dead or bottoming center therein on each discharge stroke of the piston, and a yieldable support for said motor whereby slight bodily movement of the latter may take place after seating of said piston in said chamber at the end of each such stroke.

3. A drink dispensing device comprising a valve communicably connected with a source of orange juice or like ingredient, a valve communicably connected with a source of water under pressure, said juice valve comprising a suction chamber and a reciprocable piston therein, operating mechanism for reciprocating said piston and operating said water valve in timed relation, said operating mechanism including a motor and driving connections between the same and said piston arranged to move the latter to a fully seated position in said chamber, a centrally hinged support plate for said motor, and adjustable means for supporting the end of the plate adjacent said driving connections whereby the position of the latter relative to said juice valve chamber may be varied, and spring means for supporting the opposite end of said plate.

4. A drink dispensing device comprising a valve communicably connected with a source of orange juice or like ingredient, a valve communicably connected with a source of water under pressure, said juice valve comprising a suction chamber and a reciprocable piston therein arranged to have a suction stroke and an expulsion stroke, a seat in said chamber formed and positioned to be engaged by said piston on its expulsion stroke, operating mechanism for reciprocating said piston and operating said water valve in timed relation, said operating mechanism including a motor and driving connections between the same and said piston arranged to move the latter to a fully seated position in said chamber and to urge the same beyond such position on each discharge stroke of the piston, and means whereby said operating mechanism is allowed slight movement after seating of said piston in said chamber at the end of each such stroke.

References Cited in the file of this patent

UNITED STATES PATENTS

| Number | Name | Date |
|---|---|---|
| 853,808 | Lemp | May 14, 1907 |
| 1,572,338 | Waite | Feb. 9, 1926 |
| 1,956,143 | Brown | Apr. 24, 1934 |
| 2,415,571 | Yuza | Feb. 11, 1947 |
| 2,527,250 | Goldberg | Oct. 24, 1950 |
| 2,532,118 | Nicholson | Nov. 28, 1950 |